United States Patent [19]

Kantschar et al.

[11] Patent Number: 5,357,788
[45] Date of Patent: Oct. 25, 1994

[54] MISFIRE DETECTION SYSTEM FOR AN INTERNAL COMBUSTION ENGINE

[75] Inventors: Anton Kantschar, Eberdingen-Hochdorf; Martin Klenk, Backnang; Christian Köhler, Ludwigsburg, all of Fed. Rep. of Germany

[73] Assignee: Robert Bosch GmbH, Stuttgart, Fed. Rep. of Germany

[21] Appl. No.: 61,047

[22] Filed: May 14, 1993

[30] Foreign Application Priority Data

May 14, 1992 [DE] Fed. Rep. of Germany ....... 4215938

[51] Int. Cl.⁵ .................................. G01M 15/00
[52] U.S. Cl. .................................. 73/117.3; 73/116
[58] Field of Search .................. 73/118.1, 116, 117.3; 123/419; 364/431.08

[56] References Cited

U.S. PATENT DOCUMENTS

| | | | |
|---|---|---|---|
| 4,929,034 | 5/1990 | Braschel et al. | 303/103 |
| 5,044,195 | 9/1991 | James et al. | 73/117.3 |
| 5,109,695 | 5/1992 | James et al. | 73/117.3 X |
| 5,168,859 | 12/1992 | Ohsaki | 123/679 |
| 5,197,325 | 3/1993 | Tamura et al. | 73/117.3 X |
| 5,231,869 | 8/1993 | Klenk et al. | 73/116 |
| 5,241,937 | 9/1993 | Kanehiro et al. | 123/425 |
| 5,245,866 | 9/1993 | Hashiguchi et al. | 73/117.3 |
| 5,263,453 | 11/1993 | Wakahara et al. | 73/117.3 X |
| 5,301,546 | 4/1994 | Inada et al. | 73/117.3 X |

FOREIGN PATENT DOCUMENTS 29636 1/1989 Japan .................. 123/419

Primary Examiner—Robert Raevis
Assistant Examiner—James M. Olsen
Attorney, Agent, or Firm—Walter Ottesen

[57] ABSTRACT

A misfire detection system for an internal combustion engine is disclosed with the system being used to evaluate wheel rpm fluctuations. This system detects a rough roadway over which the misfire detection is to be inhibited. This detection is made with the aid of wheel rpm signals; that is, signals as they are present for all motor vehicles equipped with anti-locking brake systems and for motor vehicles which utilize the wheel rpm signal for determining road speed. In motor vehicles of this kind, the advantage is provided that the wheel rpm signal has a double use. The advantage is provided that a reliable detection of a rough roadway is possible for all motor vehicles independently of whether wheel rpm signals are used for inhibiting the misfire detection or not.

4 Claims, 2 Drawing Sheets

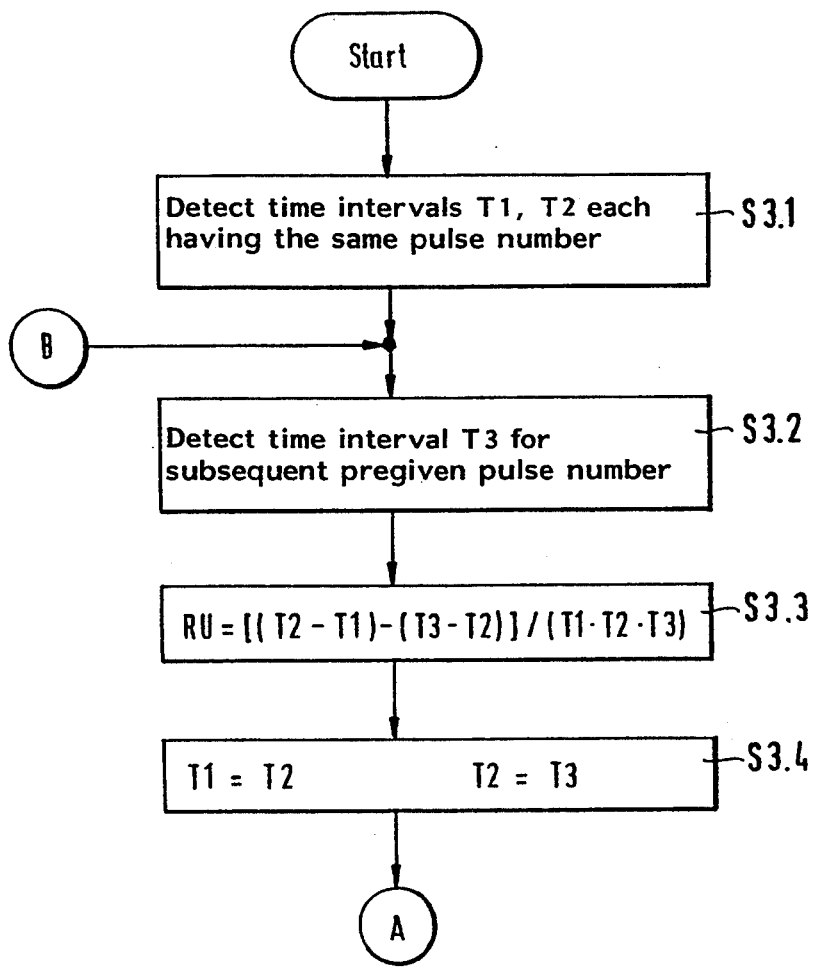
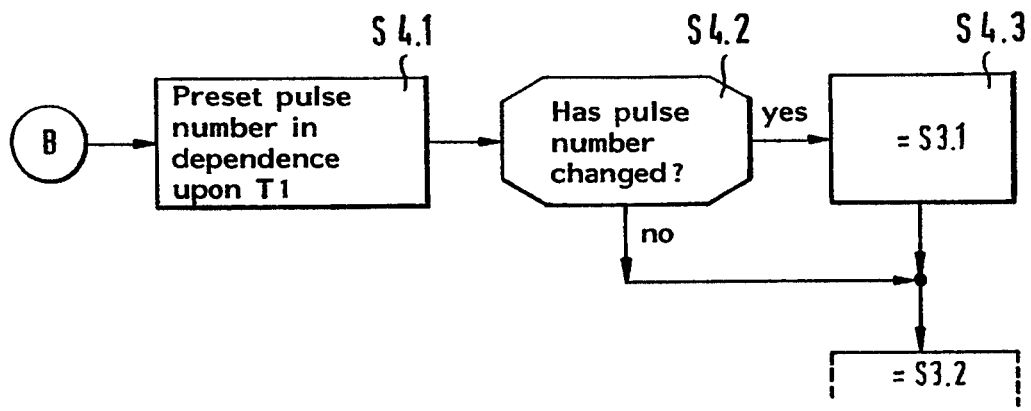

MISFIRE DETECTION SYSTEM FOR AN INTERNAL COMBUSTION ENGINE

FIELD OF THE INVENTION

The invention relates to a misfire detection system for an internal combustion engine in a motor vehicle.

BACKGROUND OF THE INVENTION

The most widely used systems for misfire detection are those wherein short-term fluctuations of the rpm of the internal combustion engine are investigated. However, it is problematic in these systems that such rpm fluctuations are generated not only by misfires but also by reaction forces which operate from the drive wheels on the engine via the drive chain. Accordingly, numerous system variations concerning the detection and evaluation of rpm fluctuations have become known. Reference can here be made, for example, to U.S. Pat. No. 5,044,195 wherein numerous publications with respect to the state of the art are delineated.

U.S. patent application Ser. No. 07/819,079, filed Jan. 10, 1992, (now U.S. Pat. No. 5,231,869) discloses an arrangement wherein the detection of misfires is interrupted at the start of pregiven operation conditions of the motor vehicle for so long until the pregiven conditions are no longer satisfied. The jarring of the motor vehicle because of externally acting forces is listed as one of the pregiven conditions. The jarring can, for example, be determined with the aid of signals from an acceleration sensor. Such a system is formed on the basis of the realization that many short-term rpm fluctuations of the wheels occur when a motor vehicle runs over a rough roadway. These rpm fluctuations of the wheels react on the rpm of the engine via the drive chain even though the elasticity thereof attenuates said rpm fluctuations.

From U.S. Pat. No. 4,929,034, it is known to change the performance of an anti-locking brake control system in dependence upon the condition of a roadway. For this purpose, a numerical value is added to a sum for each occurrence of a wheel acceleration of at least a pregiven quantity. This sum is again reduced according to a pregiven function. The actual value of the sum is used as a value for adjusting the performance of the system.

SUMMARY OF THE INVENTION

In view of the above, it is an object of the invention to provide a misfire detection system wherein the misfire in an internal combustion engine of the motor vehicle is reliably determined.

The misfire detection system of the invention is a modification of the systems referred to above in that the signal of a wheel rpm sensor is used to inhibit the misfire detection; that is, a sensor is used which is already provided on a motor vehicle equipped with an anti-locking brake system or a sensor which is present on a motor vehicle for which the road speed is derived from the signal of a wheel rpm sensor. It is then unnecessary to provide a special sensor for detecting a rough roadway such as an acceleration sensor attached to the motor vehicle.

In the system of the invention, the procedure set forth in U.S. Pat. No. 4,929,034 referred to above can be used to detect a rough roadway. Whereas the rough roadway detection system is used there to modify the performance of an anti-locking brake system, the detection is used in the system of the invention to inhibit the detection of misfires in an internal combustion engine until the roadway has an adequately good quality for a reliable determination of engine misfires. The signal of the rough-roadway detection system can be used for the detection of misfires as well as for adjusting the performance of an anti-locking brake system.

For all motor vehicles, the advantage is provided that a reliable detection of a rough roadway is possible. This is independent of whether wheel rpm signals, which use the misfire detection system for blocking the misfire detection, are available or not.

A very reliable wheel unsteadiness signal RU for detecting a rough roadway can be obtained from the following formula:

$$RU = [(T2-T1)-(T3-T2)]/f(T^3)$$

wherein:

T1, T2, T3 are time intervals in which a pregiven equal number of pulses from a wheel rpm sensor are counted sequentially; and, $f(T^3)$: is, for example, $=T1^3$ or, more specifically, $=T1 \cdot T2 \cdot T3$.

The wheel unsteadiness signal formed in this way can not only be used in the misfire detection system of the invention for inhibiting the detection of misfires but also, for example, for an anti-locking brake system for adjusting brake performance or for a chassis control for adjusting the performance of the chassis of a motor vehicle.

BRIEF DESCRIPTION OF THE DRAWINGS

The invention will now be described with reference to the drawings wherein:

FIG. 3 is a flowchart for forming the wheel-running unsteadiness value RU; and,

FIG. 4 shows a further detail to the flowchart of FIG. 2.

DESCRIPTION OF THE PREFERRED EMBODIMENTS OF THE INVENTION

Figure 1:
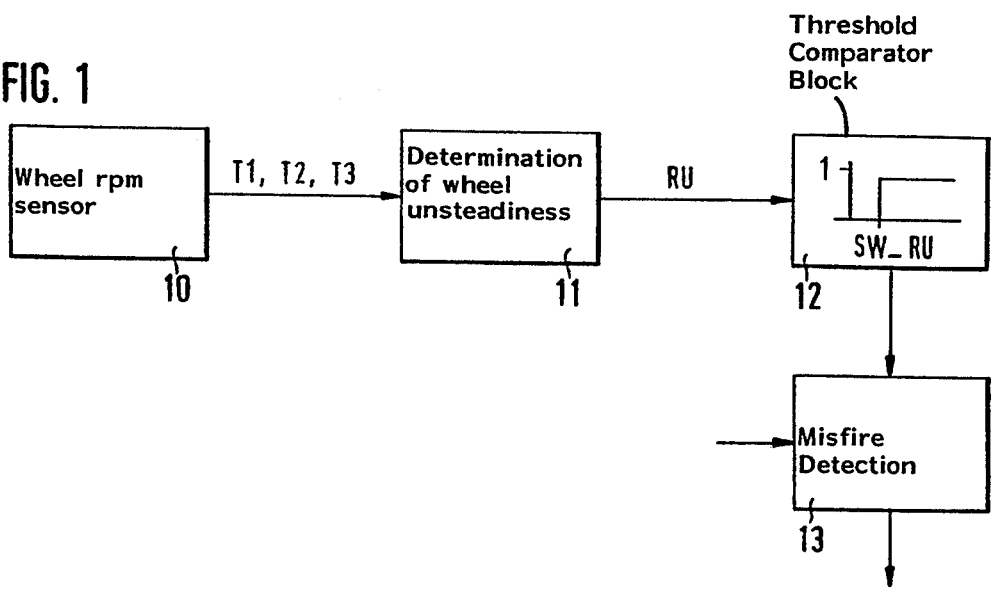
FIG. 1 is a block circuit diagram of a misfire detection system wherein the detection of misfires is inhibited in the case of travel over a rough roadway.

The misfire detection system according to the invention is shown in FIG. 1 in the form of a block schematic diagram and will be explained with reference to the flowchart of FIG. 2. The block circuit diagram of FIG. 1 includes the following components: a wheel rpm sensor 10, a wheel unsteadiness determination block 11, a threshold comparator block 12 and a misfire detection block 13. The wheel unsteadiness determination block determines a wheel unsteadiness signal RU which is compared to a pregiven threshold value SW_RU in the threshold comparator block 12. The misfire detection block 13 is notified as soon as the threshold value is exceeded whereupon the misfire detection block inhibits the misfire detection.

Figure 2:
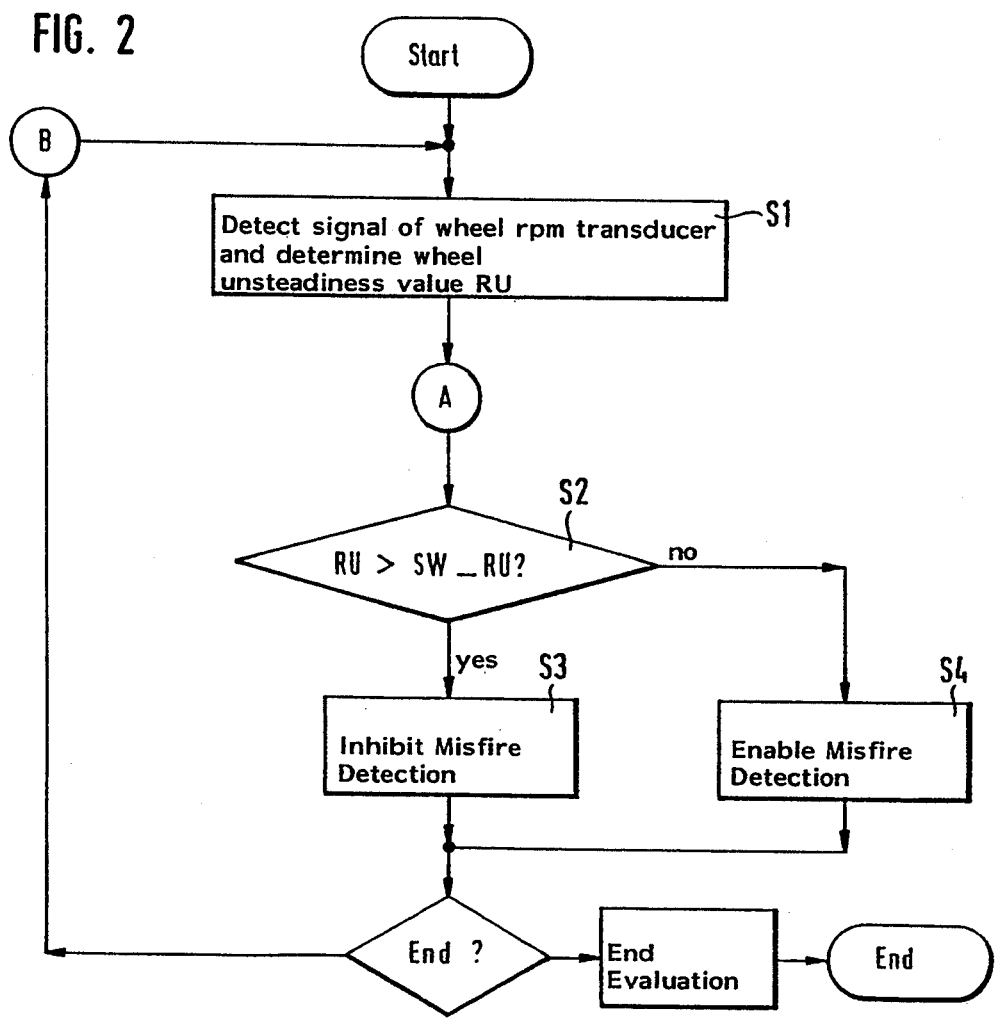
FIG. 2 is a flowchart for the system shown in FIG. 1.

According to the flowchart of FIG. 2, a signal from the wheel rpm sensor 10 is detected in a step s1 and a wheel unsteadiness value RU is determined. This value is compared to the above-mentioned value SW_RU in a step s2. If this threshold value is exceeded, then the misfire detection is inhibited in a step s3, otherwise, the detection of misfires is permitted in a step s4. Thereafter, an end step is reached wherein a final condition is interrogated, for example, whether the engine has been switched off. If this final condition is satisfied then, for example, some kind of end evaluation of measured values is undertaken and the end of the method is reached. If in contrast, this end condition is not satisfied, then the described method starts anew beginning with step s1.

The threshold value SW_RU can be selected to be relatively high since only larger wheel rpm changes become manifest as engine rpm changes because of the elasticity of the drive chain.

FIG. 3 shows the details for forming the wheel unsteadiness value RU with steps s3.1 to s3.4. First, the time intervals T1 and T2 are detected in which an equal pregiven number of pulses is detected by the wheel rpm sensor 10. In the embodiment shown, a wheel rpm sensor is used which emits 360 pulses for each rotation of the wheel and 30 pulses are first pregiven for the time interval measurement which corresponds to an angular interval of 30° of the wheel rotation. A third time interval T3 is correspondingly detected in a step s3.2. The running unsteadiness value is computed with the three time interval values according to the formula shown in step s3.3 in FIG. 3. Finally, the time interval value T1 for the next computation is set to the value of T2 and the time duration value of T2 is set to the time duration value of T3. The steps which follow mark A in FIG. 2 are then executed whereupon the step s3.2 is again reached via mark B shown in FIGS. 2 and 3 wherein a time interval T3 is detected anew.

The faster the wheel rotates, the shorter is the time interval within which 30 pulses from the wheel rpm sensor 10 are counted. The time-dependent load on the computer is too great even at average rpm. For this reason, the value of the pregiven angular interval is increased with increasing road speed in the embodiment; that is, the pregiven number of pulses is increased. This is shown in FIG. 4.

According to a step s4.1 following the mark B, the pregiven number of pulses is adjusted in dependence upon the value of the last measured time interval T1. Thereafter (step s4.2), a check is made as to whether the pregiven number of pulses has changed. If this is not the case, step s3.1 is reached directly; otherwise, values T1 and T2 (step s4.3) are again detected in a manner similar to step s3.1. In the embodiment, 30, 60 or 120 pulses corresponding to 30°, 60° or 120° wheel rotation are pregiven for low, average or high wheel rpm. The switchover from one range to another takes place with a certain hysteresis so that, for small changes of the wheel rpm, the pregiven number of pulses is not changed back and forth in a crossover region.

The formula shown in step s3.3 of FIG. 3 for computing the wheel unsteadiness value RU is only one example for a possible type of computation. This is a basic formula as it is also used for determining running roughness of an internal combustion engine. However, in the last case, the time intervals for three angular intervals one directly next to the other are not measured; instead, time intervals for equal angular intervals are measured having starts selected in accordance with specific viewpoints which are related to the combustion process. Other formulas can be used for determining the wheel unsteadiness value as they are known for determining running roughness of an engine. Furthermore, the summation method disclosed in U.S. Pat. No. 4,929,034 can be used as discussed herein initially.

It is understood that the foregoing description is that of the preferred embodiments of the invention and that various changes and modifications may be made thereto without departing from the spirit and scope of the invention as defined in the appended claims.

What is claimed is:

1. In a misfire detection system for an internal combustion engine of a motor vehicle, an arrangement for inhibiting the detection of misfires in a misfire detection system, the arrangement comprising:

sensing means for detecting wheel rpm fluctuations of at least one wheel of the motor vehicle and for providing a signal indicative of said fluctuations as a function of time;

forming means for receiving said signal and forming a wheel unsteadiness value therefrom;

comparison means for comparing said wheel unsteadiness value to a threshold value;

misfire detection inhibit means for inhibiting the detection of misfires when said threshold value is exceeded; and, means for measuring time intervals T1, T2, T3 during which said sensing means supplies, in each of said time intervals, the same pregiven equal number of pulses; and, means for computing the wheel unsteadiness value (RU) pursuant to the equation:

$$RU = [(T2-T1)-(T3-T2)]/f(T^3).$$

2. The arrangement of claim 1, wherein the following applies: $f(T^3) = T1 \cdot T2 \cdot T3$.

3. The arrangement of claim 1, wherein the pregiven pulse number is pregiven in dependence upon the rpm of the wheel.

4. The arrangement of claim 3, wherein pulse numbers are pregiven for lower, mean and higher wheel rpm's as supplied in wheel angular intervals of 30°, 60°, or 120°.

* * * * *